Oct. 13, 1931.   G. H. REIMER   1,827,439
CLOTHESLINE REEL
Filed April 18, 1929
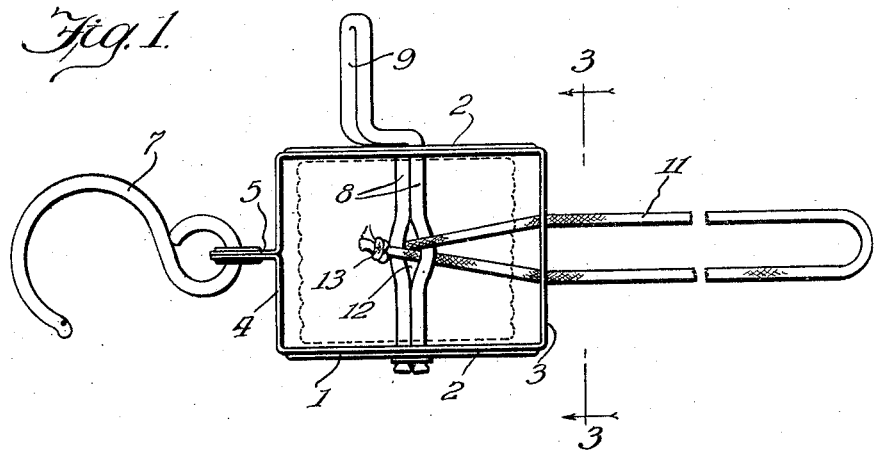
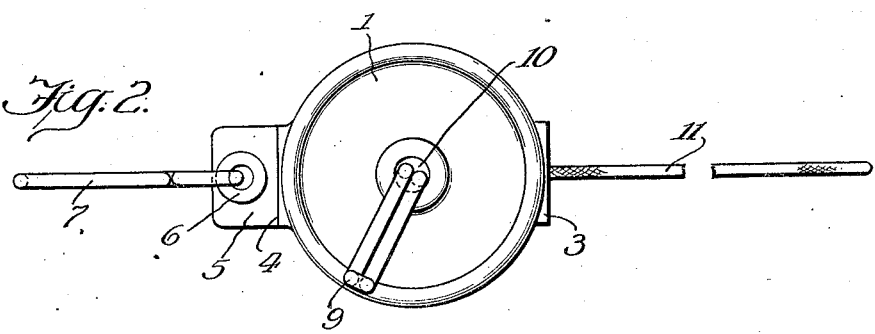
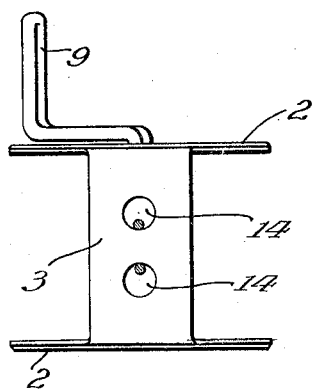
Inventor
George H. Reimer
By Arthur H. Durand
Atty Patented Oct. 13, 1931

1,827,439

UNITED STATES PATENT OFFICE

GEORGE H. REIMER, OF FULTON, ILLINOIS, ASSIGNOR TO PATENT NOVELTY COMPANY, OF FULTON, ILLINOIS, A CORPORATION OF ILLINOIS

CLOTHESLINE REEL

Application filed April 18, 1929. Serial No. 356,033.

This invention relates to clothes line reels of the kind that are commonly used in kitchens, or other rooms of dwellings or buildings, and which are sometimes used outdoors.

Generally stated, the object of the invention is to provide a clothes line reel of this kind in which means are provided for detachably hooking the reel onto a door knob, the back of a chair, the limb of a tree or other object, and having a double cord wound on the reel, whereby this cord may be looped around a chair or table or other object, thus spreading the two lines apart, and facilitating the hanging of the clothes thereon.

It is also an object to provide certain details and features of construction tending to increase the general efficiency and the desirability of a clothes line reel of this particular character.

To the foregoing and other useful ends, the invention consists in the matters hereinafter set forth and claimed, and shown in the accompanying drawings, in which,—

Fig. 1 is a plan view of a clothes line reel embodying the principles of the invention.

Fig. 2 is a side elevation of the said reel.

Fig. 3 is a vertical transverse section on line 3—3 in Fig. 1.

As thus illustrated, the reel comprises a sheet-metal body 1 having the two disk-like sides 2, the connecting end wall 3, and the connecting end wall 4 at the other side, the wall 4 being composed of two flat sections bent together and provided with end portions 5 having the hollow rivet 6 through which the hook 7 is inserted at one end, this hook being thus pivoted on the reel and being of such size and shape that it may be hooked over a door knob or the back of a chair, the limb of a tree or other similar support or object. The rotary reel proper comprises the wire members 8, which are bent into shape to provide a handle or crank 9, and to provide a rotary shaft-like member which is provided with rigid round portions 10 which rotate in openings in the disks 2 previously mentioned.

The clothes line 11 is in the form of a loop, at its outer end, and extends between the members 8 at 12, and is knotted at 13, as shown. The two strands of the line extend through holes 14 in the cross piece 3 previously mentioned, these holes serving as guides for the line.

In use, the hook 7 can be hooked over a door knob or other object, and the two strands of the line 11 can then be spread apart and looped around a chair or table, or other object, thus providing two lines for the clothes to be hung upon.

When the reel is not in use, the line is wound up by revolving the handle 9 until the two strands of the line are wound upon the members 8 constituting the axle or drum of the reel, in a manner that will be readily understood.

Thus the reel does not have to be fastened in one place every time, as to a fixed hook or ring or other device secured in a fixed place on a wall. To the contrary, the reel can be used either indoors or outdoors, and in various ways, by hooking it to various things, and by looping the line around various objects.

What I claim as my invention is:

1. In a clothes line reel, means forming a body therefor, means forming a rotary drum or axle having a crank handle at one end thereof, a clothes line attached to said axle or drum and operative to be wound thereon and unwound therefrom, at one side of the reel, and means pivoted diametrically opposite at the other side adapted for detachably hooking the reel onto a door knob or the back of a chair or the limb of a tree or other support, shaped to thus obviate the necessity of a special support for the reel, said line being double to permit looping thereof around some object, said drum handle comprising wire bent into shape to provide the handle and drum, said line being inserted between portions of said wire at the middle of the drum.

2. In a clothes line reel, means forming a body therefor, means forming a rotary drum or axle having a crank handle at one end thereof, a clothes lines attached to said axle or drum and operative to be wound thereon and unwound therefrom, at one side of the reel, and means pivoted diametrically opposite at the other side adapted for detachably hooking the reel onto a door knob or the back of a chair or the limb of a tree or other support, shaped to thus obviate the necessity of a special support for the reel, said line being double to permit looping thereof around some object, said body having separate holes for said line at one side thereof, forming guides for the line, said body having end portions secured together at said other side, forming a hole for said hooking means.

3. In a clothes line reel, means forming a body, means forming a rotary drum and handle mounted to rotate in said body, a double line attached to said drum, with a loop at the outer end of the line, whereby the line can be looped around an object to provide two separate lines spaced or spread apart, the inner ends of the line being secured together, at one side of the drum, the drum having an opening through which extend oppositely both portions of the line.

4. In a clothes line reel, means forming a body, and a wire bent back upon itself to provide a rotary double portion forming the axle or drum of the reel, and to provide a handle comprising parallel portions of the wire, together with a double line attached with its two portions extending oppositely between the wires at the middle of the drum.

Specification signed this fifteenth day of April, 1929.

GEORGE H. REIMER.